United States Patent Office 2,713,564
Patented July 19, 1955

2,713,564

SILICONE RUBBER OF IMPROVED COMPRESSION SET CONTAINING A METALLIC DIALKYL DITHIOCARBAMATE

Charles W. Pfeifer, Troy, and Richard M. Savage, Colonie, N. Y., assignors to General Electric Company, a corporation of New York No Drawing. Application May 11, 1953, Serial No. 354,391

22 Claims. (Cl. 260—37)

This invention relates to modified silicone compositions. More particularly, the invention is concerned with a composition of matter comprising (1) an organopolysiloxane convertible by heat to the solid, elastic state, and (2) from 0.05 to 2 percent, by weight, based on the weight of the organopolysiloxane, of a metallic dialkyl dithiocarbamate, for instance those having the formula

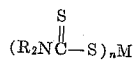

$$(R_2N\overset{S}{\underset{\parallel}{C}}-S)_nM$$

where R in the above formula is an alkyl radical (e. g., methyl, ethyl, propyl, isopropyl, butyl, hexyl, 2-ethylhexyl, decyl, etc.), M is a metal selected from the class consisting of sodium, zinc, lead, tellurium, selenium, copper and bismuth, and $n$ is an integer equal to from 1 to 4, depending upon the valence of the metallic ion M. Preferably R in the above formula is the same.

One of the objects of this invention is to improve the compression set of silicone rubbers.

Another object of the invention is to permit the manufacture of silicone rubber gaskets which can be employed at elevated temperatures without undue permanent set at these temperatures.

A still further object of the invention is to obtain silicone rubbers of low compression set using as additives for that purpose compositions requiring reduced processing precautions.

Silicone rubbers in the cured substantially infusible and insoluble state have found eminent use in many applications where continued exposure to elevated temperatures without undue deterioration is a requirement. It has been found that although silicone rubber can resist high temperatures for long periods of time, nevertheless if the silicone rubber is maintained in a compressed state at these elevated temperatures, it becomes permanently deformed when the pressure is released. Although the recovery is partial, in many applications, particularly in gasketing applications, it is highly desirable that this permanent deformation be reduced to a minimum in order to obtain the best sealing effects.

U. S. Patent 2,448,530 issued September 7, 1948, and assigned to the same assignee as the present invention, discloses the use of mercury, oxides of mercury and salts of mercury as additives for incorporation in the silicone rubber prior to vulcanization thereof for the purpose of improving the compression set of the cured or vulcanized silicone rubber. Although the mercury and the mercury compounds are quite effective in improving the compression set, because of the chemical nature of such compositions, extreme care must be exercised in using these materials because of the possible toxic effects.

We have discovered that unexpectedly a new class of materials are also effective in improving the compression set of the vulcanized silicone rubber, and that these additives which are used for this purpose do not require any particular care or precaution since they have scarcely any handling toxicity and can be used with minimum precautions. The materials which we have found are eminently suitable for improving the compression set are of the class of metallic dialkyl dithiocarbamates, the description of which is more particularly described above.

The amounts of these additives which we may employ in the practice of the invention may be varied depending on such conditions as the type of vulcanizable organopolysiloxane employed, the kind of filler used in making the silicone rubber, the specific additive employed, the application for which the vulcanized silicone rubber is intended, etc. Generally, we may employ on a weight basis, based on the weight of the convertible organopolysiloxane, from 0.05 to 2 percent, by weight, of the aforesaid dialkyl dithiocarbamates, preferably from about 0.1 to 1 percent, by weight.

The convertible silicone compositions which may be highly viscous masses or gummy, elastic solids, depending on the state of condensation, the condensing agent employed, the starting organopolysiloxane used to make the convertible organopolysiloxane, etc., will hereinafter be referred to as "convertible organopolysiloxane" or, more specifically, as "convertible methylpolysiloxane." Although convertible organopolysiloxanes with which the present invention is concerned are well known, for purposes of showing persons skilled in the art the various convertible organopolysiloxanes which may be employed in the practice of the present invention, attention is directed to the convertible organopolysiloxanes disclosed and claimed in Agens Patent 2,448,756 or Sprung et al. Patent 2,448,556, both of the aforementioned patents having issued September 7, 1948, Sprung Patent 2,484,595 issued October 11, 1949, Krieble et al. Patent 2,457,688 issued December 28, 1948, Hyde Patent 2,490,357 issued December 6, 1949, Marsden Patent 2,521,528 issued September 5, 1950, and Warrick Patent 2,541,137 issued February 13, 1951.

It will, of course, be understood by those skilled in the art that other convertible organopolysiloxanes containing the same or different silicon-bonded organic substituents, for instance, hydrocarbon radicals (e. g., methyl, ethyl, propyl, phenyl, tolyl, xylyl, benzyl, phenylethyl, naphthyl, chlorophenyl, both methyl and phenyl, etc., radicals) connected to silicon atoms by carbon-silicon linkages, may be employed without departing from the scope of the invention.

The particular convertible organopolysiloxane used is not critical and may be any one of those described in the foregoing patents which are generally obtained by condensation of an organopolysiloxane containing an average of from about 1.95, advantageously from about 1.98, to about 2.25 organic groups per silicon atom. The usual condensing agents which may be employed and which are well known in the art may include, for instance, ferric chloride, ferric chloride hexahydrate, phenyl phosphoryl chloride, alkaline condensing agents, such as potassium hydroxide, sodium hydroxide, etc. These convertible organopolysiloxanes generally comprise polymeric diorganosiloxanes which may contain, for example, up to 1 mol percent copolymerized monoorganosiloxane, for example, copolymerized monomethylsiloxane. Generally, we prefer to use as the starting organopolysiloxane (which may be liquid at room temperature) from which the convertible, for example, heat-convertible organopolysiloxane is prepared, one which contains about 1.999 to 2.01, inclusive, organic groups, for example, methyl groups, per silicon atom and where more than about 90 percent, preferably 95 percent, of the silicon atoms in the polysiloxane contain two silicon-bonded alkyl groups. These starting organopolysiloxanes (used to make the convertible organopolysiloxanes) preferably comprise organic substituents consisting essentially of monovalent organic radicals attached to silicon through carbon-silicon linkages, and in which the siloxane units consist of units of the structural formula R₂SiO where R is preferably a radical of the group consisting of methyl and phenyl radicals. At least 90 percent of the total number of R groups are preferably methyl radicals. The polysiloxane may be one in which all of the siloxane units are (CH₃)₂SiO or the siloxane may be a copolymer of dimethylsiloxane and a minor amount (e. g., from 1 to 20 mol percent) of any of the following units alone or in combination therewith:

C₆H₅(CH₃)SiO and (C₆H₅)₂SiO

A small amount of a curing agent, for instance, benzoyl peroxide, tertiary butyl perbenzoate, zirconyl nitrate, boron hydrides, etc., may be incorporated into the convertible organopolysiloxane for the purpose of accelerating its cure, as is more particularly described in various patents calling for the use of these materials as cure accelerators for silicone rubber. The curing agent functions to yield cured products having better properties, for instance, improved elasticity, tensile strength, and tear resistance than is obtained by curing a similar gum composition or convertible organopolysiloxane containing no curing agent. The amount of curing agent which may be used may be varied, for example, from about 0.1 to about 8 or more percent, preferably from about 1 to 4 percent, by weight, based on the weight of the convertible organopolysiloxane. Conversion to the cured state may also be accomplished without curing agents, as for instance by irradiation with high energy electrons, as is more particularly described in the copending Lewis et al. application Serial No. 291,542, filed June 3, 1952, and assigned to the same assignee as the present invention.

The convertible organopolysiloxane may be compounded with various fillers on ordinary rubber compounding mills, for example, silica, silica aerogel, titanium dioxide, calcium silicate, ferric oxide, chromic oxide, cadmium sulfide, asbestos, glass fibers, calcium carbonate, carbon black, lithopone, talc, gamma aluminum oxide, etc., and molded, extruded, cast or otherwise shaped as by heating under pressure to form products having physical characteristics, e. g., elasticity, compressibility, etc., similar to those of natural rubber and other known synthetic rubbers.

The elastomers comprising the cured organopolysiloxanes of the present invention are particularly characterized by their improved compression set characteristics and greater thermal stability as compared with silicone rubbers similarly made, but having none of the metallic dialkyl dithiocarbamates described above incorporated therein. Other properties, for instance, hardness, tensile strength, and elongation, are much the same as those of the cured gum composition from which the specific metallic dialkyl dithiocarbamates mentioned above are omitted.

In order that those skilled in the art may better understand how the present invention may be practiced, the following examples are given by way of illustration and not by way of limitation.

EXAMPLE 1

A convertible organopolysiloxane gum (having solid, elastic properties), specifically a polydimethylsiloxane gum (hereinafter referred to by the name "polydimethylsiloxane") substantially non-flowable at room temperature was prepared by condensing at a temperature of about 150° C. for about six hours octamethylcyclotetrasiloxane containing about 0.35 mol percent of intercondensed monomethylsiloxane, with about 0.1 percent, by weight, thereof ferric chloride. About 600 parts of this convertible methyl polysiloxane was mixed with 900 parts diatomaceous earth, and 12 parts benzoyl peroxide. A sample of this mixture of ingredients (which was prepared by mixing on a rubber compounding mill having differential rolls) was mixed with about 0.4 percent, by weight, thereof of lead dimethyl dithiocarbamate. The latter sample, together with a control from which the lead dimethyl dithiocarbamate was omitted, were molded in a closed mold in the form of flat sheets (from which test specimens could be cut) at about 130° C. for about 15 minutes at a pressure of approximately 500 p. s. i. Thereafter, the samples were removed from the press, heated for 16 hours at 100° C. in an air-circulating oven and further heated for 72 hours at 200° C. in the same oven. The physical properties of these two samples were then determined, including the compression set characteristics which were ascertained by a modification of ASTM D–395–49T. For the compression set test, discs were cut from the molded and heat-treated sheets described above. These discs were superposed upon one another until a cylinder ½ inch high was obtained. This cylinder which for brevity will hereinafter be referred to as a "plug" was compressed to 70 percent of its original thickness between steel plates and was then heated while under this compression at about 150° C. for 6 hours, and then was cooled to room temperature. The pressure was released and the thickness of the resulting plug measured 30 minutes thereafter. The figures given in Table I below, show the compression set of the plugs as a result of the treatment. A 100 percent compression set would indicate no recovery, while a zero compression set would mean that the plug had returned to its original thickness after release of the pressure.

Table I

| Ingredients, Parts | Sample Number | |
|---|---|---|
| | 1 | 2 |
| Polydimethylsiloxane | 600 | 600 |
| Diatomaceous earth | 900 | 900 |
| Benzoyl Peroxide | 12 | 12 |
| Lead Dimethyl Dithiocarbamate | | 6 |
| Percent Compression Set | 27.8 | 9.9 |

EXAMPLE 2

Using the convertible polydimethylsiloxane described in Example 1 above, a master batch of this polydimethylsiloxane was prepared by mixing together 100 parts of the polydimethylsiloxane with 125 parts diatomaceous earth and about 2.0 parts benzoyl peroxide. A sample of this formulation as well as a sample of this formulation containing about 0.07 percent, by weight, on the total formulation of zinc dimethyl dithiocarbamate was molded similarly as described in Example 1, with the exception that the after treatment at the elevated temperatures in the air circulating oven was for 72 hours at 200° C. omitting the heat treatment for 16 hours at 100° C. The samples were tested for compression set in the same manner as described above in Example 1, with the exception that the heating was conducted for about 22 hours at 350° F. while the plugs were under compression. The sample containing the zinc dimethyl dithiocarbamate showed a compression set of 20 percent as compared to 46 percent for the sample from which the zinc dimethyl dithiocarbamate was omitted.

EXAMPLE 3

A convertible organopolysiloxane was prepared by condensing in the presence of about 0.01 percent, by weight thereof, potassium hydroxide at a temperature of about 150° C. for 6 hours to give a benzene-soluble, highly viscous polydimethylsiloxane having only slight flow at room temperature. To 100 parts of this convertible polydimethylsiloxane was added on a rubber mill 39 parts silica aerogel (Santocel C) and 1.5 parts benzoyl peroxide to effect intimate dispersion of the ingredients in the convertible polydimethylsiloxane. In part of this compound was homogeneously dispersed 0.15 percent, by weight, zinc dimethyl dithiocarbamate, based on the weight of the convertible polydimethylsiloxane. A sample of this mixture, together with a control from which the zinc dimethyl dithiocarbamate was omitted, was molded similarly as was done in the above two examples and thereafter further heat-treated in an air circulating oven for 70 hours at 200° C. and the tensile strength and percent elongation of the two samples determined. In addition, each of the molded and heat-treated samples was tested for compression set in accordance with ASTM D-395-49T, Method B, using the general procedures described in Examples 1 and 2 but employing a heating cycle (when the plugs were under compression) of 22 hours at 177° C. As a result of these tests, it was found that the sample from which the zinc dimethyl dithiocarbamate was omitted had a tensile strength of 942 p. s. i., an elongation of 285 percent, and a compression set of 77 percent. In contrast to this, the sample containing the small amount of zinc dimethyl dithiocarbamate had a tensile strength of 787 p. s. i., an elongation of 345 percent, and a compression set of 34.6 percent.

It will, of course, be apparent to those skilled in the art that in addition to the convertible organopolysiloxanes employed in the foregoing examples, other organopolysiloxanes, many examples of which have been given previously, may be used without departing from the scope of the invention. Additionally, other types of vulcanization accelerators or curing agents, besides the benzoyl peroxide described above, may also be employed. Various other fillers may be used, and obviously the amount of filler may be varied considerably depending, for example, on the particular filler employed, its particle size, the specific convertible organopolysiloxane used, the purpose for which the finished product is to be used, etc. Thus, filled organopolysiloxanes may be produced containing, for instance, from about 20 to about 150 percent, by weight, filler based on the weight of the convertible organopolysiloxane. However, broader ranges of filler to convertible organopolysiloxane may be used. Thus, the filler on a weight basis may be employed in an amount equal to from about 0.15 to 3 parts of filler per part of convertible organopolysiloxane, for example, heat-convertible polydimethylsiloxane. When one employs, for instance, silica aerogel, as the filler, the amount of such filler which may advantageously be used with the convertible organopolysiloxane is much less than usual fillers, especially when the benzene-soluble diorganosiloxanes described above, having slight flow at room temperature, are used. In such instances, the amount of silica aerogel which may be tolerated in the filled composition is generally below 50 to 60 parts of the silica aerogel filler per 100 parts of the convertible organopolysiloxane.

Obviously, other metallic dialkyl dithiocarbamates in addition to those described in the foregoing examples, may be employed without departing from the scope of the invention. Among such metallic dialkyl dithiocarbamates may be mentioned, for instance, lead diethyl dithiocarbamate, lead dipropyl dithiocarbamate, zinc diethyl dithiocarbamate, zinc methyl ethyl dithiocarbamate, tellurium dimethyl dithiocarbamate, selenium diethyl dithiocarbamate, copper diethyl dithiocarbamate, bismuth dipropyl dithiocarbamate, sodium dimethyl dithiocarbamate, sodium diethyl dithiocarbamate, etc. The amount of metallic dialkyl dithiocarbamate used in the practice of the present invention may also be varied. Generally, no particular advantage is derived from incorporating amounts of dialkyl dithiocarbamate in excess of 2 percent, and amounts greater than these values may undesirably affect the properties of the silicone rubber.

The products of this invention are useful in such applications, for instance, as gaskets, tubing, electrical conductor insulation, shock absorbers, etc. They are particularly suitable for use as gaskets in applications involving high temperature compression conditions especially in those places where they may be subjected to the effects of halogenated hydrocarbons as insulating media, namely, in the manufacture of capacitors. Because of their resistance to heat they have value as materials for use in applications where natural or other synthetic rubbers fail owing to the deleterious effect of heat. Elastomers produced by the practice of our invention have the additional property of retaining their flexibility at low temperatures, e. g., at temperatures as low as −60° C. Solutions or dispersions of the herein described compositions can also be prepared and used for coating and impregnating purposes of various surfaces and fibrous materials (e. g., glass cloth, asbestos cloth, etc.) and thereafter converted, for instance, by heat or other means to give heat-resistant and water-repellent surfaces. Laminated products from such coated and impregnated sheet material can also be prepared using techniques well known in the art.

What we claim as new and desire to secure by Letters Patent of the United States is:

1. A composition of matter comprising (1) an organopolysiloxane convertible to the cured, solid, elastic state, and (2) from 0.05 to 2 percent, by weight, based on the weight of the organopolysiloxane, of a metallic dialkyl dithiocarbamate having the formula

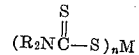

where R is an alkyl radical, M is a metal selected from the class consisting of sodium, zinc, lead, tellurium, selenium, copper and bismuth, and $n$ is an integer equal to from 1 to 4 depending on the valence of the metal ion M, the organic groups of the aforesaid organopolysiloxane being hydrocarbon groups attached directly to silicon by carbon-silicon linkages.

2. A composition of matter comprising (1) a polydimethylsiloxane convertible by heat to the cured, solid, elastic state, and (2) from 0.05 to 2 percent, by weight, based on the weight of the polydimethylsiloxane, of zinc dimethyl dithiocarbamate.

3. A composition comprising (1) an organopolysiloxane convertible by heat to the cured, solid, elastic state, the aforesaid organopolysiloxane comprising essentially a diorganosiloxane of the recurring structural unit $$R'_2SiO$$

in which R' represents radicals selected from the class consisting of silicon-bonded monovalent methyl and aryl radicals, and in which diorganosiloxane at least 75% of the total number of R' groups are methyl radicals, and (2) from 0.05 to 2 percent, by weight, based on the weight of the organopolysiloxane, of a metallic dialkyl dithiocarbamate having the formula

where R is an alkyl radical, M is a metal selected from the class consisting of sodium, zinc, lead, tellurium, selenium, copper, and bismuth, and $n$ is an integer equal to from 1 to 4, depending on the valence of the metal ion M.

4. A composition of matter comprising (1) a polydimethylsiloxane convertible by heat to the cured, solid, elastic state, and (2) from 0.05 to 2 percent, by weight, based on the weight of the polydimethylsiloxane, of a metallic dialkyl dithiocarbamate having the formula

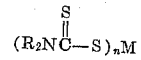

where R is an alkyl radical, M is a metal selected from the class consisting of sodium, zinc, lead, tellurium, selenium, copper and bismuth, and $n$ is an integer equal to from 1 to 4, depending on the valence of the metal ion M.

5. A composition of matter comprising (1) a methylpolysiloxane convertible by heat to the cured, solid, elastic state, and (2) from 0.05 to 2 percent, by weight, based on the weight of the methylpolysiloxane, of lead dimethyl dithiocarbamate.

6. A composition of matter comprising (1) a methylpolysiloxane convertible by heat to the cured, solid, elastic state, and (2) from 0.05 to 2 percent, by weight, based on the weight of the methylpolysiloxane, of selenium dimethyl dithiocarbamate.

7. An elastomer comprising the heat-cured elastic product of claim 3.

8. A heat-curable elastic composition comprising (1) a methylpolysiloxane convertible by heat to the cured, solid, elastic state, (2) from 0.05 to 2 percent, by weight, of a metallic dialkyl dithiocarbamate having the formula $$(R_2N\overset{\overset{S}{\|}}{C}-S)_nM$$

where R is an alkyl radical, M is a member selected from the class consisting of sodium, zinc, lead, tellurium, selenium, copper and bismuth, and $n$ is an integer equal to from 1 to 4 depending on the valence of the metal ion M, and (3) from 0.1 to 8 percent, by weight, of a curing agent for the aforesaid methylpolysiloxane, the weight of (2) and (3) being based on the weight of the methylpolysiloxane.

9. A heat-curable composition comprising (1) an organopolysiloxane convertible by heat to the cured, solid, elastic state, (2) from 0.05 to 2 percent, by weight, of a compression set additive comprising a metallic dialkyl dithiocarbamate having the formula $$(R_2N\overset{\overset{S}{\|}}{C}-S)_nM$$

where R is an alkyl radical, M is a metal selected from the class consisting of sodium, zinc, lead, tellurium, selenium, copper and bismuth, and $n$ is an integer equal to from 1 to 4 depending on the valence of the metal ion M, (3) from 0.1 to 8 percent, by weight, of a curing agent for (1) comprising benzoyl peroxide, and (4) a filler, the weights of (2) and (3) being based on the weight of the organopolysiloxane, the organic groups in the latter organopolysiloxane being hydrocarbon groups attached to silicon by carbon-silicon linkages.

10. An elastomer comprising the heat-cured elastic product of claim 9.

11. A heat-curable composition of matter comprising (1) a methylpolysiloxane convertible by heat to the cured, solid, elastic state, (2) from 0.05 to 2 percent, by weight, zinc dimethyl dithiocarbamate, (3) from 0.1 to 4 percent, by weight, benzoyl peroxide, and (4) a filler, the weights of (2) and (3) being based on the weight of the methylpolysiloxane.

12. A heat-curable composition of matter comprising (1) a methylpolysiloxane convertible by heat to the cured, solid, elastic state, (2) from 0.05 to 2 percent, by weight, lead dimethyl dithiocarbamate, (3) from 0.1 to 4 percent, by weight, benzoyl peroxide, and (4) a filler, the weights of (2) and (3) being based on the weight of the methylpolysiloxane.

13. A heat-curable composition of matter comprising (1) a methylpolysiloxane convertible by heat to the cured, solid, elastic state, (2) from 0.05 to 2 percent, by weight, selenium dimethyl dithiocarbamate, (3) from 0.1 to 4 percent, by weight, benzoyl peroxide, and (4) a filler, the weights of (2) and (3) being based on the weight of the methylpolysiloxane.

14. A product comprising the cured composition of claim 11.

15. A product comprising the cured composition of claim 12.

16. A product comprising the cured composition of claim 13.

17. A product comprising a synthetic elastomer obtained by curing a heat-convertible methylpolysiloxane containing, by weight, from 0.05 to 2 percent zinc dimethyl dithiocarbamate, from 0.1 to 4 percent benzoyl peroxide, and a filler comprising silica aerogel, the weights of the zinc dimethyl dithiocarbamate and benzoyl peroxide being based on the weight of the methylpolysiloxane.

18. A product comprising a synthetic elastomer obtained by curing a convertible methylpolysiloxane containing, by weight, from 0.05 to 2 percent lead dimethyl dithiocarbamate, from 0.1 to 4 percent benzoyl peroxide, and a filler comprising silica aerogel, the weights of the lead dimethyl dithiocarbamate and the benzoyl peroxide being based on the weight of the methyl polysiloxane.

19. The method which comprises (1) incorporating a filler, a curing agent, and from 0.05 to 2 percent, by weight, of a metallic dialkyl dithiocarbamate having the formula $$(R_2N\overset{\overset{S}{\|}}{C}-S)_nM$$

where R is an alkyl radical, M is a metal selected from the class consisting of sodium, zinc, lead, tellurium, selenium, copper and bismuth, and $n$ is an integer equal to from 1 to 4 based on the valence of the metallic ion M, into an organopolysiloxane convertible by heat to the cured, solid, elastic state, said additive being capable of improving the compression set of the cured organopolysiloxane, and (2) heating the above mixture of ingredients at an elevated temperature to effect conversion thereof to the cured, solid, elastic state.

20. The method as in claim 19 in which the filler is silica aerogel.

21. The method as in claim 19 in which the curing agent is benzoyl peroxide.

22. An elastomer comprising the heat-cured product of claim 1.

References Cited in the file of this patent

UNITED STATES PATENTS

| | | |
|---|---|---|
| 2,442,059 | Safford | May 25, 1948 |
| 2,387,518 | Lightbown et al. | Oct. 23, 1945 |
| 2,541,137 | Warrick | Feb. 13, 1951 |